United States Patent [19]

Kishi

[11] Patent Number: 4,495,243
[45] Date of Patent: Jan. 22, 1985

[54] RELEASE AGENT AND PRODUCT

[75] Inventor: Takaji Kishi, Itami, Japan

[73] Assignee: Sekisui Kagaku Kogyo Kabushiki Kaisha, Osaka, Japan

[21] Appl. No.: 180,010

[22] Filed: Aug. 21, 1980

[30] Foreign Application Priority Data

Aug. 24, 1979 [JP] Japan ............................ 54-108483

[51] Int. Cl.$^3$ ............................................. C09J 7/02
[52] U.S. Cl. ................................. 428/352; 428/354;
428/423.7; 428/425.1; 525/199; 525/200;
525/205; 525/207; 525/208; 525/217; 525/218;
526/245; 526/264; 526/271; 526/273; 526/301;
526/307.3; 526/312
[58] Field of Search ............................ 428/352, 40–42,
428/514, 423.7, 425.1, 424.6, 354; 525/199, 200,
217, 218, 205, 208, 207; 526/245, 312, 264, 271,
273, 301, 307.3

[56] References Cited

U.S. PATENT DOCUMENTS 2,816,655 12/1957 Crozier et al.
2,822,290 2/1958 Webber .
2,876,894 3/1959 Dahlquist et al.
3,051,588 8/1962 Lavanchy .
3,052,566 9/1962 Smith .
4,241,198 12/1980 Kobayashi ........................ 428/352

FOREIGN PATENT DOCUMENTS 29-3144  6/1954 Japan .
29-7333 11/1954 Japan .
35-6225  6/1960 Japan .
40-17661 8/1965 Japan .
 864483  4/1961 United Kingdom .

Primary Examiner—Bernard D. Pianalto
Attorney, Agent, or Firm—Wenderoth, Lind & Ponack

[57] ABSTRACT

A release agent comprising (A) a polymer of at least one vinyl monomer of the general formula $$CH_2=CR_1COO(CH_2CHR_2O)_nCONHR \qquad (I)$$

wherein $R_1$ and $R_2$, independently from each other, represent hydrogen or a methyl group, R represents an alkyl group having at least 12 carbon atoms or a fluoroalkyl group having at least 6 carbon atoms, and n is an integer of from 1 to 6, (B) a copolymer of at least one vinyl monomer of general formula (I) above and another compound copolymerizable therewith, or a mixture of said polymer (A) and said copolymer (B); and a product prepared by coating the said release agent on a non-adhesive surface of an adhesive article having an adhesive surface and the non-adhesive surface or on the surface of a release paper.

8 Claims, No Drawings

RELEASE AGENT AND PRODUCT

FIELD OF THE INVENTION

This invention relates to a release agent for articles containing adhesives, such as adhesive tapes, adhesive labels and adhesive sheets. More specifically, this invention relates to a release agent which is suitably used in these articles as a thin coated layer on the back surface of a substrate to be in contact with the tacky surface of another substrate or on the surface of a release paper to facilitate peeling from a tacky surface.

BACKGROUND OF THE INVENTION

Release agents used in adhesive items such as adhesive tapes are roughly divided into silicones and other organic compounds. The silicone-type release agents are characterized by having a very low peel strength, but have the defect that a moderate degree of peel strength is difficult to obtain, it is difficult to obtain close adhesion to a variety of substrates, and coatings of these release agents require baking at high temperatures. In many adhesive products, a moderate degree of peel strength is desired, and therefore, the organic compound-type release agents have gained widespread acceptance.

The release agents of the latter type commonly contain long-chain alkyl groups or long-chain fluorinated alkyl groups in the molecules as branches or side-chains, and, as the inventors believe, exhibit their respective characteristics depending upon the type of a polymeric main chain to which the long-chain alkyl groups are bonded, or upon the manner of bonding.

All of the conventional release agents have one or more defects, and have not proved to be entirely satisfactory. Among these defects are included the following.

(1) The synthesizing or manufacturing method is not simple. Since raw materials of unstable quality are used, the quality of the resulting release agent is not stable. The cost of production is also high.

(2) The release agents do not have good solubility in solvents which have low toxicity and are suitable for practical coating purposes.

(3) Since these release agents generally have a low softening point (mostly below 80° C.), they are liable to dissolve in adhesive agents owing to time lapse, heating aging, etc. even after coating.

(4) Since these release agents generally have low adhesion to substrates, they migrate into adhesive agents with time. Or, in peeling, they separate from the substrates and migrate to the surface of the adhesive agent to reduce the tackiness of the adhesive surface.

(5) There is little room for modification of the basic formulation of a release agent, and the types of substrates with which the release agents are compatible are limited.

SUMMARY OF THE INVENTION

It is an object of this invention to remedy the defects of the conventional release agents simultaneously, and to provide a release agent which is easy to produce, dissolves in solvents having low toxicity, has a high softening temperature, adheres closely to many kinds of substrates, has excellent stability to aging and exhibits the high peeling property.

According to this invention, there is provided a release agent comprising (A) a polymer of at least one vinyl monomer of the general formula $$CH_2=CR_1COO(CH_2CHR_2O)_nCONHR \qquad (I)$$

wherein $R_1$ and $R_2$, independently from each other, represent hydrogen or a methyl group, R represents an alkyl group having at least 12 carbon atoms or a fluoroalkyl group having at least 6 carbon atoms, and n is an integer of from 1 to 6, (B) a copolymer of at least one vinyl monomer of general formula (I) above and another compound copolymerizable therewith, or a mixture of said polymer (A) and said copolymer (B).

DETAILED DESCRIPTION OF THE INVENTION

The vinyl monomer of general formula (I) used in this invention can be produced by addition reaction between a hydroxyl-terminated vinyl monomer of the general formula $$CH_2=CR_1COO(CH_2CHR_2O)_nH \qquad (II)$$

wherein $R_1$ and $R_2$ represent hydrogen or a methyl group, and n is an integer of from 1 to 6,
and a long-chain alkyl monoisocyanate of the formula $$RNCO \qquad (III)$$

wherein R represents an alkyl group having at least 12 carbon atoms or a fluoroalkyl group having at least 6 carbon atoms.

Examples of the hydroxyl-terminated vinyl monomer of general formula (II) are 2-hydroxyethyl acrylate, 2-hydroxyethyl methacrylate, 2-hydroxypropyl acrylate, diethylene glycol monomethacrylate and tetraethylene glycol monomethacrylate. Examples of the long-chain alkyl monoisocyanate of formula (III) include dodecyl isocyanate, tetradecyl isocyanate, hexadecyl isocyanate, octadecyl isocyanate, eicosyl isocyanate, and 1,1-dihydroperfluoroalkyl isocyanates with the perfluoroalkyl group containing at least 6 carbon atoms.

In one embodiment of this invention, a polymer (A) obtained by polymerizing only a vinyl monomer of general formula (I) by an ordinary method using a catalyst such as benzoyl peroxide is used as the release agent.

The polymer (A) includes a homopolymer obtained by polymerizing only one vinyl monomer of formula (I), and a copolymer obtained by copolymerizing at least two vinyl monomers of formula (I). The homopolymer of the vinyl monomer is a polymer having recurring units of the following general formula

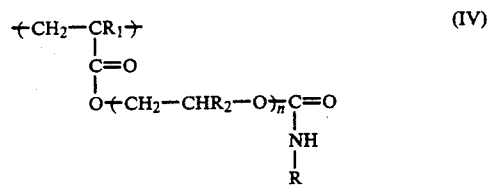

wherein R, $R_1$ and n are as defined above.

The release agent comprising the polymer (A) exhibits satisfactory performance when applied to substrates of most adhesive items now in use. Depending upon the type of the substrate or the adhesive agent or the purpose of use, however, a copolymer (B) obtained by copolymerizing at least one vinyl monomer of general formula (I) with another compound copolymerizable therewith may be used as the release agent. Alternatively, the release agent of this invention may comprise a mixture of the polymer (A) and the polymer (B). The use of the copolymer (B) makes it possible to modify the properties of the release agent or to impart a special property thereto.

The main purpose of using the copolymer (B) is generally twofold: i.e., (1) to dilute the polymer (A) by copolymerization of a lower-cost monomer in such an amount that the characteristics attributed to the component of general formula (I) are not lost, and (2) to increase the chemical affinity of the polymer (A) with the desired substrate by copolymerization of a monomer selected to suit this purpose.

As regards the purpose (1), the lower limit of the amount of the component of general formula (I) which affects those properties of the copolymer (B) which are attributed to the component of general formula (I) is about 40% although it may vary according to the purpose of using the release agent. In other words, the polymer (A) may be diluted with up to about 60% of another monomer. The monomer used for this purpose is not specifically limited, and includes, for example, stearyl acrylate, stearyl methacrylate, stearyl acrylamide, stearyl methacrylamide, vinyl stearate, stearyl vinyl ether, methyl acrylate, methyl methacrylate, ethyl acrylate, ethyl methacrylate, vinyl acetate, and styrene.

In the case of the purpose (2), a monomer having a higher polarity than the vinyl monomer of formula (I), or a monomer capable of inducing a hydrogen bonding may, for example, be used. This brings about the following two main effects. (i) The chemical polarity of the release agent is further increased, or a hydrogen bonding is generated between the release agent and the substrate to increase its adhesion to the substrate. (ii) The increased polarity leads to a higher softening point. Examples of such monomers capable of inducing a hydrogen bonding are 2-hydroxyethyl methacrylate, 2-hydroxyethyl acrylate, 2-hydroxypropyl acrylate, the other monomers represented by general formula (II), acrylic acid, methacrylic acid, monoesters of maleic acid, and monoesters of itaconic acid. Examples of monomers which increase polarity are crotonic acid, maleic anhydride, glycidyl methacrylate and acrylonitrile, methylvinyl ketone, and N-vinyl pyrolidone.

A special example of the copolymer (B) is a graft polymer prepared by polymerizing the vinyl monomer of general formula (I) in the presence of another kind of polymer as a trunk polymer. The other kind of polymer may be a polymer which can itself be used as a release agent, and this is generally preferred. In performing the aforesaid graft polymerization, the product may sometimes be obtained as a mixture of the graft copolymer and a polymer of the vinyl monomer of general formula (I). Such a mixed polymer can also be used as the release agent of this invention.

A mixture of the polymer (A) and/or the copolymer (B) containing the vinyl monomer of general formula (I) as at least a part of the constituent component thereof with another polymer not containing the vinyl monomer of general formula (I) as a constituent component may be used as the release agent of this invention provided that the weight proportion of the component derived from the vinyl monomer of general formula (I) is at least 40% based on the total weight of the mixture.

Since the release agent of this invention dissolves well in solvents having low toxicity, it can be adhered firmly to a substrate by dissolving it in such a solvent, coating the solution on the back surface of the substrate or the surface of a release paper substrate in adhesive products and drying the coating.

The release agent of this invention can find extensive use in many kinds of substrates including plastic films and paper. It is simple to produce, dissolves well in solvents having low toxicity, exhibit high release property, has a high softening point, and adheres closely to a substrate. On the other hand, since it does not easily dissolve in adhesive agents, it retains its high release property even under severe service conditions.

The following Examples illustrate the present invention more specifically.

EXAMPLE 1

A reactor was charged with 65 g (0.5 mole) of 2-hydroxyethyl methacrylate, 148 g (0.5 mole) of octadecyl isocyanate and 210 g of benzene, and while introducing nitrogen, they were heated with stirring for about 5 hours at 60° to 65° C., and then for 8 hours under reflux (at about 91° C.) to effect addition reaction between 2-hydroxyethyl methacrylate and octadecyl isocyanate.

Subsequently, polymerization was performed by adding a solution of 0.6 g of benzoyl peroxide in 45 g of benzene dropwise to the reactor under refluxing conditions over the course of 10 hours, and refluxing the mixture further for 2 hours. During the polymerization, 120 g of ethyl acetate was additionally fed in three portions in order to prevent a rise in viscosity. After the polymerization, the reaction mixture was poured into methanol to separate the polymerization product which was washed, pulverized and dried to afford 198 g (yield 92%) of a polymer as a white powder.

The polymer had a softening point of 89° C. Infrared absorption spectroscopy and elemental analysis led to the determination that the polymer had structural units of the following formula.

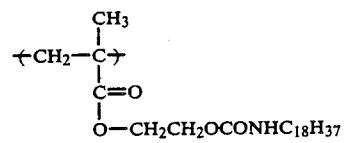

The polymer was dissolved in cyclohexane to a concentration of 0.5% by weight. The resulting release agent solution was coated on one surface of a 40 micron-thick unplasticized polyvinyl chloride film at a rate of 10 g/m², air-dried for 10 minutes, and then dried at 60° C. for 2 minutes to form a film of the release agent thereon. For comparison, a polyvinyl chloride film having no coating of the release agent solution was provided as a blank sample.

To test the peel property and heat deterioration resistance of the release agent-coated surface, an adhesive polyester tape having a width of 20 mm (Sekisui Polyester Tape #21, a product of Sekisui Kagaku Kogyo K.K.; containing an adhesive of the polyacrylate ester type) as a standard tape was applied to the surface of the film of the release agent and to the blank surface. A rubber-lined roller having a weight of 2 kg was reciprocated at a speed of 30 cm/min through 2 cycles over the adhesive polyester tape to bond it to the surface of the film of the release agent and to the blank surface. Thus, a plurality of such test specimens were prepared.

The specimens were divided into two groups. One group was stored at 20° C. for 4 days, and the other was heated for 3 days in an air desiccator at 60° C. and then allowed to stand for one day at room temperature. The two groups of specimens were subjected to the following tests.

(1) The standard tape was peeled from the above film at an angle of 180° and a speed of 30 cm/min., and the peel strength was measured.

(2) The standard tape peeled off in the above measurement (1) was applied to paper-polished stainless steel plate, and bonded to it by reciprocating a rubber-lined roller having a weight of 2 kg at a speed of 30 cm/min. over the standard tape through two cycles. The bonded structure was allowed to stand for 2 hours. Then, the standard tape was peeled at an angle of 180° and a speed of 30 cm/min., and the peel strength (SP adhesion strength) was measured.

For comparison, the standard tape was directly tested by the above method (2), and the peel strength (SP adhesion strength) was measured.

The results are shown in Table 1.

TABLE 1

| | Unit: g/20 mm | | | | |
|---|---|---|---|---|---|
| | Example 1 | | Comparison (with no release agent) | | Standard tape |
| | Not heated | Heated | Not heated | Heated | (direct) |
| Peel strength | 386 | 433 | 620 | 974 | — |
| SP adhesion strength | 577 | 551 | 571 | 543 | 579 |

It is seen from the results shown in Table 1 that the releasing agent prepared in this Example imparts ease of peeling to the polyvinyl chloride film without adverse affects on the adhesive agent, and this property is not deteriorated even when the releasing agent is heated. It is clear that this release agent produces an excellent result in the preparation of an adhesive tape using a polyvinyl chloride film as a substrate.

EXAMPLE 2

A reactor was charged with 52 g (0.4 mole) of 2-hydroxyethyl methacrylate, 118 g (0.4 mole) of octadecyl isocyanate and 170 g of benzene, and the addition reaction of 2-hydroxyethyl methacrylate and octadecyl isocyanate was performed in the same way as in Example 1. Subsequently, 8.6 g (0.1 mole) of methacrylic acid was put into the reactor. Copolymerization was performed by adding a solution of 0.6 g of benzoyl peroxide in 45 g of benzene dropwise under refluxing conditions to the reactor over the course of 6 hours, and refluxing the reaction mixture further for 2 hours. During the polymerization, a mixture of 50 g of ethyl acetate and 50 g of methyl ethyl ketone was additionally put into the reactor in two portions in order to prevent a rise in viscosity. After the polymerization, the reaction mixture was put into methanol to separate the copolymerization product which was washed, pulverized and dried to afford 157 g (yield 88%) of a copolymer as a white powder.

The polymer had a softening point of 113° C. Infrared absorption spectroscopy and elemental analysis led to the determination that the copolymer molecule consisted of

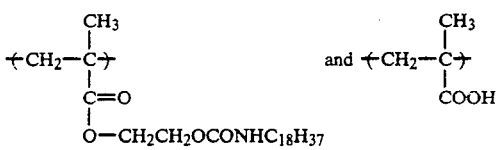

at a ratio of about 4:1.

The copolymer was divided in a 4:1 mixture of cyclohexane and methyl ethyl ketone to a concentration of 0.2% by weight. The resulting solution of the release agent was coated on one surface of a 40 micron thick cellophane film at a rate of 10 g/m², and dried to form a film of the release agent.

The film was tested in the same way as in Example 1 using an adhesive cellophane tape as a standard tape. The results are shown in Table 2 below.

TABLE 2

| | Unit: g/20 mm | | | | |
|---|---|---|---|---|---|
| | Example 2 | | Comparison (with no release agent) | | Standard tape |
| | Not heated | Heated | Not heated | Heated | (direct) |
| Peel strength | 245 | 294 | 316 | 538 | — |
| SP adhesion strength | 312 | 296 | 307 | 291 | 310 |

It is seen from the results shown in Table 2 that this release agent imparts excellent peelability without appreciable adverse effects on the adhesive agent even under heat, and it is clear that this realease agent produces an excellent result in the production of an adhesive cellophane tape.

EXAMPLE 3

In substantially the same way as in Example 2, 0.1 mole of maleic anhydride was copolymerized with 0.4 mole of an adduct of 2-hydroxyethyl methacrylate and octadecyl isocyanate. After the polymerization, the reaction mixture was poured into acetone to separate the copolymerization product which was washed, pulverized and dried to afford 152 g (yield 84.5%) of a copolymer as a slightly pink powder.

The copolymer had a softening point of 92° C. Infrared absorption spectroscopy and elemental analysis led to the determination that the copolymer molecule consisted of

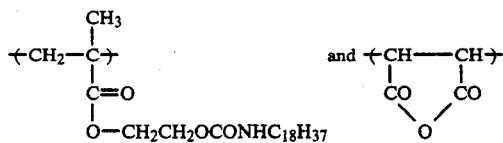

in a ratio of about 4:1.

The copolymer was dissolved in a 3:2 mixture of cyclohexane and ethyl acetate to a concentration of 0.2% by weight. The resulting solution of the release agent was coated on one surface of a 40 micron thick cellophane film at a rate of 10 g/m², and then worked up in the same way as in Example 2 to prepare test specimens. The test specimens were examined for peel strength and SP adhesion strength in the same way as in Example 1. The results are shown in Table 3.

TABLE 3

| | Example 3 | | Comparison (with no release agent) | | Standard tape (direct) |
|---|---|---|---|---|---|
| Unit: g/20 mm | | | | | |
| | Not heated | Heated | Not heated | Heated | |
| Peel strength | 249 | 311 | 316 | 538 | — |
| SP adhesion strength | 298 | 290 | 307 | 291 | 310 |

It is seen from the results shown in Table 3 that this release agent imparts excellent peelability without adverse effects on the adhesive agent even under heat.

EXAMPLE 4

A reactor was charged with 65 g (0.5 mole) of 2-hydroxyethyl methacrylate, 118 g (0.4 mole) of octadecyl isocyanate and 180 g of benzene. While introducing nitrogen gas, they were heated with stirring at 60° to 65° C. for 5 hours and then under reflux for 8 hours. Then, under refluxing conditions, a solution of 0.6 g of benzoyl peroxide in 45 g of benzene was added dropwise to the reactor over the course of 6 hours to polymerize 2-hydroxyethyl methacrylate and octadecyl isocyanate. The mixture was refluxed for additional 2 hours. During the polymerization, a mixture of 60 g of benzene and 60 g of ethyl acetate was added in two portions in order to prevent a rise in viscosity. After the polymerization, the reaction mixture was poured into methanol to separate the polymerization product which was then washed, pulverized, and dried to afford 172 g (yield 94%) of a polymer as a white powder.

The polymer had a softening point of 97° C. It was determined that the polymer contained

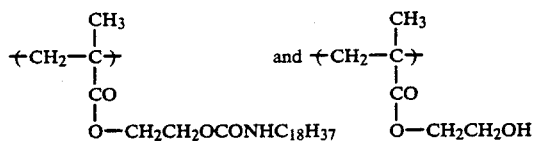

as molecular structural units.

The polymer was then dissolved in a 4:1 mixture of cyclohexane and methyl ethyl ketone to a concentration of 0.3% by weight. The resulting solution of the release agent was coated on one surface of a 38 micron thick polyester film at a rate of 10 g/m², and dried to afford a film of the release agent.

The film of the release agent was tested in the same way as in Example 1 using an adhesive polyester tape as a standard tape. The results are shown in Table 4.

TABLE 4

| | Example 4 | | Comparison (with no release agent) | | Standard tape (direct) |
|---|---|---|---|---|---|
| Unit: g/20 mm | | | | | |
| | Not heated | Heated | Not heated | Heated | |
| Peel strength | 367 | 435 | 586 | 618 | — |
| SP adhesion strength | 581 | 568 | 572 | 559 | 579 |

It is seen from the results shown in Table 4 that this release agent shows excellent peelability and even under heat, its peelability and the adhesiveness of the tape are scarcely deteriorated.

EXAMPLE 5

In substantially the same way as in Example 2, 0.45 mole of an adduct of 2-hydroxyethyl methacrylate and octadecyl isocyanate was copolymerized with 0.04 mole of glycidyl methacrylate to afford 192 g (yield 97%) of a copolymer as a white powder.

This copolymer had a softening point of 90° C., and was determined to have

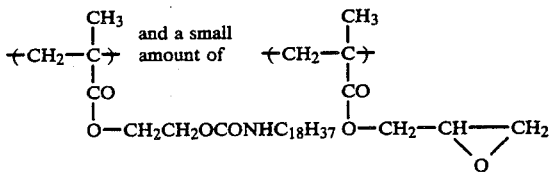

as molecular structural units.

The copolymer was dissolved in a 7:3 mixture of cyclohexane and methyl ethyl ketone to a concentration of 0.6% by weight. The resulting solution of the release agent was coated at a rate of 10 g/m² on the surface of a substrate obtained by laminating polyethylene having a basis weight of 20 g/m² to one surface of a sheet of wood-free paper having a basis weight of 50 g/m². The coating was dried to form a film of the release agent on the polyethylene surface.

The resulting film of the release agent was tested in the same way as in Example 1 using an adhesive kraft paper tape as a standard tape. The results are shown in Table 5.

TABLE 5

| | Example 5 | | Comparison (with no release agent) | | Standard tape (direct) |
|---|---|---|---|---|---|
| Unit: g/20 mm | | | | | |
| | Not heated | Heated | Not heated | Heated | |
| Peel strength | 294 | 386 | 498 | 720 | — |
| SP adhesion strength | 497 | 485 | 483 | 476 | 493 |

EXAMPLE 6

A reactor was charged with 45.5 g (0.35 mole) of 2-hydroxyethyl methacrylate, 26.1 g (0.15 mole) of diethylene glycol monomethacrylate, 147.5 g (0.5 mole) of octadecyl isocyanate, 150 g of benzene and 50 g of ethyl acetate. While introducing nitrogen gas, they were heated with stirring at 60° to 65° C. for 5 hours, and then under reflux for 8 hours. Then, 4.3 g (0.05 mole) of methacrylic acid was put into the reactor, and under refluxing conditions, a solution of 0.6 g of benzoyl peroxide in 45 g of benzene was added dropwise over the course of 6 hours to perform copolymerization. The mixture was refluxed further for 2 hours. During the polymerization, 70 ml of methyl ethyl ketone was additionally fed. There was obtained 130 g (yield 87%) of a copolymer as a white powder. The copolymer had a softening point of 88° C.

The copolymer was then dissolved in a 1:1 mixture of cyclohexane and methyl ethyl ketone to a concentration of 0.6% by weight. The resulting solution of the release agent was coated on one surface of a 40 micron thick stretched polypropylene film at a rate of 10 m/g², and dried to form a film of the release agent.

The film of the release agent was tested in the same way as in Example 1 using an adhesive stretched polypropylene tape as a standard tape. The results are shown in Table 6.

TABLE 6

Unit: g/20 mm

|  | Example 6 | | Comparison (with no release agent) | | Standard tape (direct) |
| --- | --- | --- | --- | --- | --- |
|  | Not heated | Heated | Not heated | Heated |  |
| Peel strength | 238 | 413 | 479 | 640 | — |
| SP adhesion strength | 442 | 425 | 430 | 406 | 443 |

It is seen from the results shown in Table 6 that this release agent exhibits excellent peelability, and is suitable at least for use in adhesive tape having a stretched polypropylene film as a substrate.

EXAMPLE 7

A reactor was charged with 58 g (0.5 mole) of 2-hydroxyethyl arcylate, 148 g (0.5 mole) of octadecyl isocyanate and 210 g of benzene to perform addition reaction and subsequent polymerization in substantially the same way as in Example 1 to afford 177 g (yield 86%) of a polymer as a white powder. The polymer had a softening point of 82° C.

The polymer was then dissolved in a 4:1 mixture of cyclohexane and ethyl acetate to a concentration of 0.4% by weight. The resulting solution of the release agent was coated on one surface of a polyvinyl chloride film having a thickness of 40 microns and dried to form a film of the release agent. The film of the release agent was tested in the same way as in Example 1 using an adhesive polyester tape as a standard tape. The results are shown in Table 7.

TABLE 7

|  | Example 7 | | Comparison (with no release agent) | | Standard tape (direct) |
| --- | --- | --- | --- | --- | --- |
|  | Not heated | Heated | Not heated | Heated |  |
| Peel strength | 403 | 429 | 620 | 974 | — |
| SP adhesion strength | 576 | 568 | 571 | 543 | 579 |

It is seen from the results shown in Table 7 that this release agent exhibits excellent peelability, and is suitable for use, for example, in a polyvinyl chloride adhesive tape.

EXAMPLE 8

In substantially the same way as in Example 2, 0.4 mole of an adduct of 2-hydroxyethyl acrylate and octadecyl isocyanate was copolymerized with 0.1 mole of methacrylic acid to afford 163 g (yield 93%) of a copolymer as a white powder. This copolymer had a softening point of 93° C.

Then, the copolymer was dissolved in a 3:2 mixture of cyclohexane and ethyl acetate to a concentration of 0.2% by weight. The resulting solution of the release agent was coated on one surface of a 40 micron thick cellophane film at a rate of 10 g/m², and dried to form a film of the release agent. The film of the release agent was tested in the same way as in Example 1 using an adhesive cellophane tape as a standard tape. The results are shown in Table 8.

TABLE 8

Unit: g/20 mm

|  | Example 8 | | Comparison (with no release tape) | | Standard tape (direct) |
| --- | --- | --- | --- | --- | --- |
|  | Not heated | Heated | Not heated | Heated |  |
| Peel strength | 237 | 298 | 316 | 538 | — |
| SP adhesion strength | 320 | 303 | 307 | 291 | 310 |

It is seen from the results shown in Table 8 that this release agent shows excellent peelability, and is suitable at least for use in an adhesive cellophane tape.

EXAMPLE 9

In substantially the same way as in Example 2, 0.45 mole of an adduct of 2-hydroxyethyl acrylate and octadecyl isocyanate was copolymerized with 0.05 mole of tetraethylene glycol monomethacrylate to afford 167 g (yield 84%) of a copolymer as a white powder. This copolymer had a softening point of 88° C., and was determined to contain

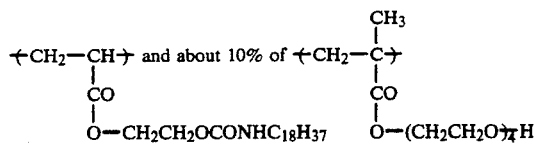

as molecular structural units.

The copolymer was then dissolved in a 7:3 mixture of cyclohexane and methyl ethyl ketone to a concentration of 0.5% by weight. The resulting solution of the release agent was coated on the surface of a one-surface calendered glassine paper having a basis weight of 60 g/m², and dried to form a film of the release agent thereon. The film of the release agent was tested in the same way as in Example 1 using an adhesive kraft paper tape as a standard tape. The results are shown in Table 9.

TABLE 9

Unit: g/20 mm

|  | Example 9 | | Comparison (with no release agent) | | Standard tape (direct) |
| --- | --- | --- | --- | --- | --- |
|  | Not heated | Heated | Not heated | Heated |  |
| Peel strength | 293 | 531 | 634 | Unmeasurable | — |
| SP | 472 | 446 | 395 | Unmeas- | 493 |

TABLE 9-continued

| | Example 9 | | Comparison (with no release agent) | | Standard tape (direct) |
|---|---|---|---|---|---|
| | Not heated | Heated | Not heated | Heated | |
| adhesion strength | | | urable | | |

Unit: g/20 mm

The peel strength and SP adhesion strength of the heated comparative specimens could not be measured because the glassine paper was removed away together at the time of peeling.

It is seen from the results shown in Table 9 that this release agent has excellent peelability, and acts effectively when directly coated on, or impregnated in, a paper substrate of fine texture.

EXAMPLE 10

A reactor was charged with 52 g (0.4 mole) of 2-hydroxypropyl acrylate, 118 g (0.4 mole) of octadecyl isocyanate and 170 g of benzene. While introducing nitrogen gas, they were heated with stirring at 60° to 65° C., and then under reflux for 8 hours. Then, 7.2 g (0.1 mole) of acrylic acid was put into the reactor. Under refluxing conditions, a solution of 0.8 g of benzoyl peroxide in 45 g of benzene was added dropwise over the course of 9 hours. The mixture was refluxed further for 2 hours to perform copolymerization. During the polymerization, a mixture of 60 g of cyclohexane and 40 g of ethyl acetate was added in two portions. There was obtained 158 g (yield 89.2%) of a copolymer as a white powder. The copolymer has a softening point of 81° C.

The copolymer was dissolved in a 9:1 mixture of cyclohexane and isopropanol to a concentration of 0.4% by weight. The resulting solution of the release agent was coated at a rate of 10 g/m² on one surface of a 40 micron thick cellulose diacetate film, and dried to form a film of the release agent thereon. The film of the release agent was tested in the same way as in Example 1 using an adhesive polyester tape as a standard tape. The results are shown in Table 10.

TABLE 10

| | Example 10 | | Comparison (with no release agent) | | Standard tape (direct) |
|---|---|---|---|---|---|
| | Not heated | Heated | Not heated | Heated | |
| Peel strength | 326 | 331 | 580 | 632 | — |
| SP adhesion strength | 570 | 568 | 563 | 547 | 579 |

Unit: g/20 mm

It is seen from the results shown in Table 10 that this release agent has excellent peeling property, peelability, and is useful at least for an adhesive cellulose diacetate tape.

EXAMPLE 11

This Example illustrates a special embodiment in which a vinyl monomer in accordance with this invention is polymerized in the presence of a polymeric release agent synthesized by a separate method.

First step

This step is to synthesize a polymeric release agent (referred to as component b).

A 1-liter three-necked flask was charged with 46.8 g (0.3 mole) of a methyl vinyl ether/maleic anhydride copolymer (GANTREZ, AN 119, a tradename for a product of GAF Corp.), 81.0 g (0.3 mole) of stearylamine, 150.0 g of methyl ethyl ketone and 70.0 g of toluene. With stirring, the temperature was gradually raised. The mixture was continuously heated under reflux (84° C.) for 10 hours. Then, the reaction mixture was poured into methanol to precipitate the resulting adduct which was separated, washed, pulverized and dried to afford 121 g of a red powder.

This product had a basic structural unit of the following formula

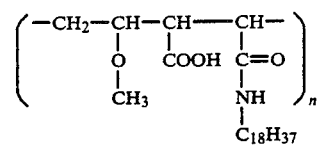

and had a softening point of 158° C.

This product itself has a release effect, but its higher softening point, high polarity attributed to carboxyl groups, methoxy groups, etc. and film hardness are utilized for the purpose of modification.

Second step

In this step, synthesis of the monomer in accordance with this invention (referred to as component a) and synthesis of a polymer of the monomer in the presence of the component b are effected in succession.

A reactor was charged with 11.6 g (0.10 mole) of 2-hydroxyethyl acrylate, 48.0 g (0.13 mole) of polypropylene glycol monomethacrylate (molecular weight about 370), 59.0 g (0.20 mole) of octadecyl isocyanate, 40.0 g of toluene and 80.0 g of methyl ethyl ketone, and while introducing nitrogen gas, the mixture was heated with stirring at 60° to 65° C. for 5 hours, and then under reflux (87° C.) for 8 hours. Subsequently, dropwise addition of a solution of 0.8 g of benzoyl peroxide in 60 g of methyl ethyl ketone was started. While adding about one-fifth of the entire solution dropwise during 1 hour (when the viscosity of the reaction mixture slightly increased to about 1000 centipoises), a solution of 50 g of the component b in 60 g of methyl ethyl ketone and 60 g of toluene obtained under heat was gradually put into the reaction mixture over the course of about 10 minutes. Subsequently, the remainder of the benzoyl peroxide solution was added dropwise over the course of 12 hours. The mixture was further refluxed with stirring for 4 hours to terminate the reaction. The reaction mixture was then poured into methanol to generate a brown precipitate which was then separated, washed, pulverized and dried to obtain 122 g of a pale brown powder. This product had the property of slowly softening at a temperature ranging from about 70° to about 120° C. It was presumed that the product was a mixture of a polymer of the component a and graft polymers resulting from grafting of the component a in various ways to the component b.

The resulting copolymer was dissolved in a 6:3:1 mixture of toluene, methyl ethyl ketone and methanol to a concentration of 0.2% by weight. The resulting solution of the release agent was coated on one surface of a 40 micron thick cellophane film at a rate of 10 g/m², and on one surface of a 40 micron thick stretched polypropylene film at a rate of 20 g/m², and dried to form a film of the release agent thereon.

The film of the release agent on the cellophane film was tested in the same way as in Example 2, and the film of the release agent on the stretched polypropylene film was tested in the same way as in Example 6. The results are shown in Tables 11 (for the cellophane film) and 12 (for the polypropylene film).

TABLE 11

Unit: g/20 mm

| | Example 11 (cellophane) | | Comparison (with no release agent) | | Standard tape (direct) |
|---|---|---|---|---|---|
| | Not heated | Heated | Not heated | Heated | |
| Peel strength | 234 | 287 | 316 | 538 | — |
| SP adhesion strength | 290 | 283 | 307 | 291 | 310 |

TABLE 12

Unit: g/20 mm

| | Example 11 (polypropylene) | | Comparison (with no release agent) | | Standard tape (direct) |
|---|---|---|---|---|---|
| | Not heated | Heated | Not heated | Heated | |
| Peel strength | 229 | 402 | 479 | 640 | — |
| SP adhesion strength | 431 | 417 | 430 | 406 | 443 |

It is seen from the results shown in Tables 11 and 12 that the release agent in this Example is also suitable for a cellophane film and a stretched polypropylene film.

What we claim is:

1. A release agent comprising:
(A) a polymer of at least one vinyl monomer of the formula $$CH_2=CR_1COO(CH_2CHR_2O)_nCONHR \quad (I)$$

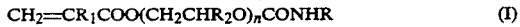

wherein $R_1$ and $R_2$, independently from each other, represent hydrogen or a methyl group, R represents an alkyl group having at least 12 carbon atoms or a fluoroalkyl group having at least 6 carbon atoms, and n is an integer of from 1 to 6, said vinyl monomer of formula (I) being an adduct of a compound of the following formula $$CH_2=CR_1COO(CH_2CHR_2O)_nH \quad (II)$$

wherein $R_1$, $R_2$ and n are as defined above, with a compound of the following formula $$RNCO \quad (III)$$

wherein R is as defined above, (B) a copolymer of at least one vinyl monomer of general formula (I) above and at least one other monomer selected from the group consisting of stearyl acrylate, stearyl methacrylate, stearyl acrylamide, stearyl methacrylamide, vinyl stearate, stearyl vinyl ether, methyl acrylate, methyl methacrylate, ethyl acrylate, ethyl methacrylate, vinyl acetate, styrene, 2-hydroxyethyl methacrylate, 2-hydroxyethyl acrylate, 2-hydroxypropyl acrylate, diethylene glycol monomethacrylate, tetraethylene glycol monomethacrylate, polypropylene glycol monomethacrylate, acrylic acid, methacrylic acid, monoesters of maleic acid, monoesters of itaconic acid, crotonic acid, maleic anhydride, glycidyl methacrylate acrylonitrile, methyl vinyl ketone, and N-vinyl pyrrolidone, or
(C) a mixture of said polymer (A) and said copolymer (B).

2. A product prepared by coating the release agent of claim 1 on the surface of a release paper.

3. The release agent of claim 1 wherein said polymer (A) is a homopolymer of said vinyl monomer (I).

4. The release agent of claim 1 wherein said polymer (A) is a copolymer of at least two of said vinyl monomers of general formula (I).

5. A product prepared by coating the release agent of claim 1 on a non-adhesive surface of an adhesive article having an adhesive surface and the non-adhesive surface.

6. The release agent of claim 1 wherein the copolymer (B) is derived from at least 40% by weight of said vinyl monomer of general formula (I) and at most 60% by weight of said other monomer.

7. The release agent of claim 8 wherein said trunk polymer itself has a release action.

8. The release agent of claim 1 wherein said copolymer (B) is a graft copolymer resulting from graft copolymerization of said vinyl monomer of general formula (I) with a trunk polymer.

* * * * *